United States Patent
Chao et al.

(10) Patent No.: US 6,801,593 B2
(45) Date of Patent: Oct. 5, 2004

(54) SUBCRITICAL REACTIVITY MEASUREMENT METHOD

(75) Inventors: Yung-An Chao, Pittsburgh, PA (US); Donald James Hill, Pittsburgh, PA (US); Michael David Heibel, Irwin, PA (US); Jeffrey Robert Secker, Monroeville, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 119 days.

(21) Appl. No.: 10/301,044

(22) Filed: Nov. 21, 2002

(65) Prior Publication Data

US 2004/0101082 A1 May 27, 2004

(51) Int. Cl.[7] ............................................. G21C 17/44
(52) U.S. Cl. ....................... 376/254; 376/245; 376/255
(58) Field of Search ................................ 376/245, 254, 376/255

(56) References Cited

U.S. PATENT DOCUMENTS

| | | | | |
|---|---|---|---|---|
| 3,197,375 A | * | 7/1965 | Borst | 376/171 |
| 3,424,653 A | * | 1/1969 | Cohn | 376/214 |
| 4,077,836 A | * | 3/1978 | Omori et al. | 376/214 |
| 4,277,308 A | * | 7/1981 | Rusch et al. | 376/254 |
| 4,305,786 A | * | 12/1981 | Schultz | 376/254 |
| 4,515,749 A | * | 5/1985 | Schoenig et al. | 376/254 |
| 4,582,672 A | * | 4/1986 | Tuley et al. | 376/254 |
| 4,588,547 A | | 5/1986 | Impink et al. | 376/254 |
| 4,920,548 A | * | 4/1990 | Gaussa et al. | 376/255 |
| 4,990,302 A | * | 2/1991 | Oda et al. | 376/216 |
| 5,076,998 A | * | 12/1991 | Graham | 376/254 |
| 5,490,184 A | | 2/1996 | Heibel | 376/254 |
| 6,061,412 A | | 5/2000 | Stucker et al. | 376/217 |
| 6,181,759 B1 | | 1/2001 | Heibel | 376/214 |

FOREIGN PATENT DOCUMENTS

DE             2137504      *  2/1973

OTHER PUBLICATIONS

Mogilner et al , "Statistical methods of measuring absolute reactor power", Soviet Atomic Energy, vol. 20, No. 4, Feb. 1966, pp. 141–147.*

* cited by examiner

Primary Examiner—Jack Kam
Assistant Examiner—John Richardson

(57) ABSTRACT

A method of monitoring reactivity changes in a nuclear reaction when the nuclear reaction is subcritical. The method controls the parameter of the nuclear reaction that affects reactivity of the reaction to slightly alter the reactivity while monitoring an output of a source range detector. The Inverse Count Rate Ratio from the output of the detector is determined periodically during a transient portion of the output. A correction factor is applied to the Inverse Count Rate Ratio data and the data is plotted as a function of time. The correction factor linearizes the Inverse Count Rate Ratio data so that the curve can be predictably extrapolated.

11 Claims, 1 Drawing Sheet

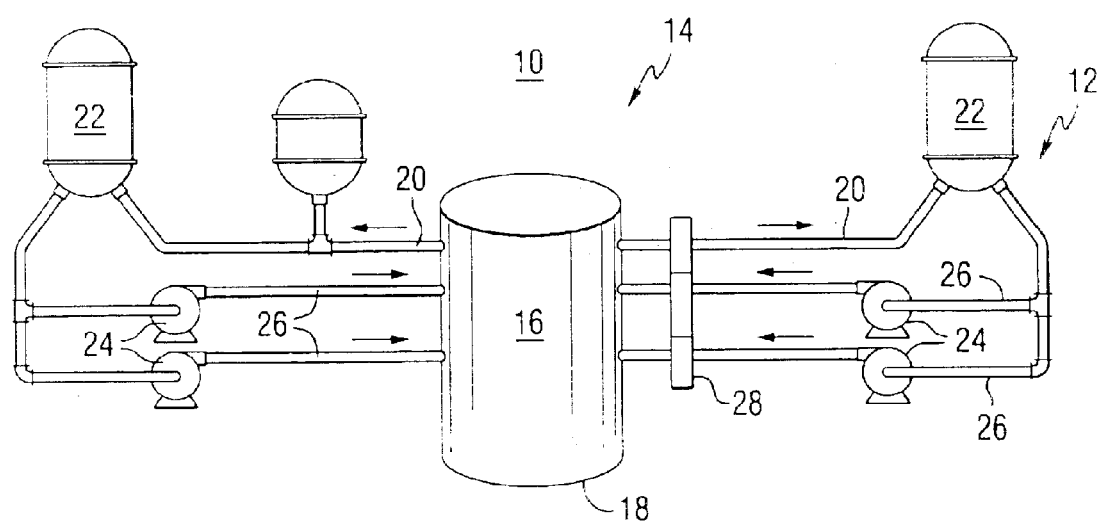

SUBCRITICAL REACTIVITY MEASUREMENT METHOD

BACKGROUND OF THE INVENTION

1. Field of the Invention

This invention relates to a method for measuring the subcritical neutron multiplication factor, $K_{eff}$ of a nuclear reaction, and more particularly, to a method for determining all reactivity changes that occur while a core of a nuclear reactor is subcritical.

2. Background Information

In a pressurized water reactor power generating system, heat is generated within the core of a pressure vessel by a fission chain reaction occurring in a plurality of fuel rods supported within the core. The fuel rods are maintained in space relationship within fuel assemblies with the space between fuel rods forming coolant channels through which borated water flows. The hydrogen within the coolant water moderates the neutrons emitted from enriched uranium within the fuel to increase the number of nuclear reactions and thus increase the efficiency of the process. Control rod guide thimbles are interspersed within the fuel assemblies in place of fuel rod locations and serve to guide control rods, which are operable to be inserted or withdrawn from the core. When inserted, the control rods absorb neutrons and thus reduce the number of nuclear reactions and the amount of heat generated within the core. Coolant flows through the assemblies out of the reactor to the tube side of steam generators where heat is transferred to water in the shell side of the steam generator at a lower pressure, which results in the generation of steam used to drive a turbine. The coolant exiting the tube side of the steam generator is driven by a main coolant pump back to the reactor in a closed loop cycle to renew the process.

The power level of a nuclear reactor is generally divided into three ranges: The source or startup range, the intermediate range, and the power range. The power level of the reactor is continuously monitored to assure safe operation. Such monitoring is typically conducted by means of neutron detectors placed outside and inside the reactor core for measuring the neutron flux of the reactor. Since the neutron flux in the reactor at any point is proportional to the fission rate, the neutron flux is also proportional to the power level.

Fission and ionization chambers have been used to measure flux in the source, intermediate and power range of a reactor. Typical fission and ionization chambers are capable of operating at all normal power levels, however, they are generally not sensitive enough to accurately detect low level neutron flux emitted in the source range. Thus, separate low level source range detectors are typically used to monitor neutron flux when the power level of the reactor is in the source range.

The fission reactions within the core occur when free neutrons at the proper energy level strike the atoms of the fissionable material contained within the fuel rods. The reactions result in the release of a large amount of heat energy which is extracted from the core in the reactor coolant and in the release of additional free neutrons which are available to produce more fission reactions. Some of these released neutrons escape the core or are absorbed by neutron absorbers, e.g., control rods, and therefore do not cause additional fission reactions. By controlling the amount of neutron-absorbent material present in the core, the rate of fission can be controlled. There are always random fission reactions occurring in the fissionable material, but when the core is shut down, the released neutrons are absorbed at such a high rate that a sustained series of reactions do not occur. By reducing the neutron-absorbent material until the number of neutrons in a given generation equals the number of neutrons in the previous generation, the process becomes a self-sustaining chain reaction and the reactor is said to be "critical". When the reactor is critical, the neutron flux is six or so orders of magnitude higher than when the reactor is shut down. In some reactors, in order to accelerate the increase in neutron flux in the shutdown core to achieve practical transition intervals, an artificial neutron source is implanted in the reactor core among the fuel rods containing the fissionable material. This artificial neutron source creates a localized increase in the neutron flux to aid in bringing the reactor up to power.

In the absence of a neutron source, the ratio of the number of free neutrons in one generation to those in the previous generation is referred to as the "Neutron Multiplication Factor" ($K_{eff}$) and is used as a measure of the reactivity of the reactor. In other words, the measure of criticality for a nuclear core is $K_{eff}$, that is, the ratio of neutron production to total neutron loss contributable to both destruction and loss. When $K_{eff}$ is greater than 1, more neutrons are being produced than are being destroyed. Similarly, when $K_{eff}$ is less than 1, more neutrons are being destroyed than are being produced. When $K_{eff}$ is less than 1, the reactor is referred to as being "subcritical". Currently, there is no direct method for measuring when criticality will occur from the source range excore detectors. Presently, plant operators estimate when criticality will occur through a number of methods. One method for estimating when criticality will occur is made by plotting the inverse ratio of the count rate obtained from the source range detector as a function of the change in the condition being used to bring the plant critical, e.g., withdrawal of the control rods. When the plant goes critical, the source range count rate approaches infinity and hence, the Inverse Count Rate Ratio (ICRR) goes to zero. Due to the physics of the reactions occurring within the core-of the reactor, the ICRR curve is almost always convex, and sometimes concave. Therefore, estimating the conditions under which the plant will go critical from the ICRR curve is subject to much uncertainty, but also subject to considerable scrutiny by the Nuclear Regulatory Commission and International Nuclear Power Organization.

U.S. Pat. No. 4,588,547 discloses a method and apparatus for determining the nearness to criticality of a nuclear core. The invention takes advantage of the fact that when the reactor is subcritical, the neutron flux generated by an artificial neutron source, and the direct progeny by fission, is higher than that generated by neutrons from natural neutron sources in the reactor fuel and progeny of those neutrons. However, that method does not appear applicable to reactors that do not use artificial neutron sources and does not address the approach to criticality when a reactor approaches criticality due to withdrawal of control rods.

U.S. Pat. No. 6,181,759 discloses another method of estimating the Neutron Multiplication Factor $K_{eff}$ that involves control rod withdrawal and the measurement of the source range detectors at a number of discrete spaced-time intervals during a transient portion of the source range output. While this method appears applicable for a wider range of startup conditions, it still only provides an estimate rather than a direct measure, which requires that a conservative margin be designed into the estimate to satisfy regulatory concerns.

Accordingly, it is an object of this invention to provide a means of more accurately measuring when the core of the reactor approaches criticality.

It is an additional object of this invention to provide a method for directly measuring reactivity changes when the reactor is subcritical.

Additionally, it is an object of this invention to provide a linear measure of reactivity changes over time from the source range detector outputs.

SUMMARY OF THE INVENTION

This invention provides a direct measure of the Subcritical Neutron Multiplication Factor $K_{eff}$ by applying a correction factor to the ICRR curve data that results in the corrected data being linear in $K_{eff}$. The correction factor is derived by analytically determining the impact of the dimensional nature of a nuclear core on the response of excore detectors. From the application of the correction factor, changes in $K_{eff}$, known as reactivity, resulting from a change being made to the reactor, e.g. control rod withdrawal, can be determined along with the absolute value of $K_{eff}$. Application of the correction factor will thus enable $K_{eff}$ to be determined even when the reactor core is deeply subcritical, i.e., $K_{eff}$ equal to 0.92.

BRIEF DESCRIPTION OF THE DRAWINGS

A further understanding of the invention can be gained from the following description of the preferred embodiments when read in conjunction with the accompanying drawing in which:

FIG. 1 is a schematic representation of the primary side of a nuclear power generating system.

DETAILED DESCRIPTION OF THE PREFERRED EMBODIMENT

FIG. 1 illustrates the primary side of a nuclear electric power generating plant 10 in which a nuclear steam supply system 12 supplies steam for driving a turbine generator (not shown) to produce electric power. The nuclear steam supply system 12 has a pressurized water reactor 14 which includes a reactor core 16 housed within a pressure vessel 18. Fission reactions within the reactor core 16 generate heat, which is absorbed by a reactor coolant, light water, which is passed through the core. The heated coolant is circulated through hot leg piping 20 to a steam generator 22. Reactor coolant is returned to the reactor 14 from the steam generator 22 by a reactor coolant pump 24 through cold leg piping 26. Typically, a pressurized water reactor has at least two and often three or four steam generators 22 each supplied with heated coolant through a hot leg 20, forming with the cold leg 26 and reactor coolant pump 24, a primary loop. Each primary loop supplies steam to the turbine generator. Two such loops are shown in FIG. 1.

Coolant returned to the reactor 14 flows downward through an annular downcomer, and then upward through the core 16. The reactivity of the core, and therefore the power output of the reactor 14, is controlled on a short term basis by control rods, which may be selectively inserted into the core. Long term reactivity is regulated through control of the concentration of a neutron moderator such as boron dissolved in the coolant. Regulation of the boron concentration affects reactivity uniformly throughout the core as the coolant circulates through the entire core. On the other hand, the control rods affect local reactivity and therefore, result in an asymmetry of the axial and radial power distribution within the core 16.

Conditions within the core 16 are monitored by several different sensor systems. These include an excore detector system 28, which measures neutron flux escaping from the reactor vessel 14. The excore detector system 28 includes source range detectors used when the reactor is shut down, intermediate range detectors used during startup and shutdown, and power range detectors used when the reactor is above approximately 5% power. Incore detectors are also typically employed during power operation.

Nuclear power plants and other nuclear facilities such as spent nuclear fuel pits have no direct measure of reactivity or $K_{eff}$ when the plant or facility is subcritical. Nuclear power plants currently estimate the conditions at which the plant will go critical. This estimate is usually done based on the amount of control rod withdrawal and/or soluble boron concentration, but other changes, such as coolant temperature changes, could be used to make the plant critical. A nuclear power plant is critical when there is a self-sustaining chain reaction where neutron production is equal to neutron absorption or loss from the core. The measure of criticality for a nuclear core is $K_{eff}$; the ratio of neutron production to neutron loss, i.e., absorption or escape from the core. When $K_{eff}$ is greater than 1, more neutrons are being produced than are being destroyed. Similarly when $K_{eff}$ is less than 1, more neutrons are being lost than are being produced. When $K_{eff}$ is less than 1, the reactor is referred to as being subcritical. The estimate of when criticality will occur is made by plotting the inverse ratio of the count rate being obtained from the source range detectors as a function of the change in the condition being used to bring the plant critical, e.g., withdrawal of the control rods. When the plant goes critical, the source range count rate approaches infinity, and the Inverse Count Rate Ratio (ICRR) goes to zero. Due to the physics of the core, the ICRR curve is almost always convex, and sometimes concave, in shape. Therefore, estimating the conditions under which the plant will go critical from the ICRR curve is subject to much uncertainty.

To aid in the prediction of the ICRR curve, the ability to represent fixed neutron sources was added to a standard neutron flux solution code, e.g., the Advanced Nodal Code, licensable from Westinghouse Electric Company LLC, Monroeville, Pa. The standard flux solution code is used to predict core behavior, e.g., power distribution, over the next operating cycle. From reactor theory, it can be shown that the response of the excore detector to the change being used to make the reactor critical is linear if the nuclear core is only a point. It is the dimensional nature of the nuclear core that makes the ICRR curve nonlinear; being either concave or convex in shape. In accordance with this invention, a way was found to analytically determine the impact of the dimensional nature of the nuclear core on the response of the excore detectors. By applying this analytically determined information to the measured excore detector response, a function that is linear in $K_{eff}$ is obtained. Thus changes in $K_{eff}$, known as reactivity, resulting from the change being made to the reactor, can be determined along with the absolute value of $K_{eff}$. This has enormous value to a utility because, with this information, the utility will know by how much reactivity the reactor is shut down or subcritical. Thus, the utility will know how safe the core is, when the core will go critical ($K_{eff}=1.0$), what changes will have to be made to make the core critical and whether all of the appropriate technical specification requirements are being met. In addition, the utility will be able to measure reactivity changes while the core is subcritical. Thus, it is possible to perform Control and Shutdown Bank measurements typically performed during the Low Power Physics Testing (LPPT) while the plant is subcritical. This will reduce the amount of time the plant is shut down for refueling, because performing the LPPT is the last event that occurs before taking the plant up to power and generating electricity. The LPPT measures critical core parameters such as boron concentration, worth of individual control banks and moderator temperature coefficients to demonstrate that the design margin is adequate, a necessary step before the reactor is permitted to return to power. Thus, the ability to perform the majority of the LPPT while the plant is subcritical has significant economic value to a utility.

The correction factor for the ICRR data to make the curve linear was determined from the following analytical analysis:

$$\text{Excore Signal} = \int \omega \phi \, dV = SSF * \int \phi \, dV, \quad (1)$$

where $\omega$=the fraction of neutrons originating in a fuel assembly (i,j) that reach the excore detector. $\omega$ is determined analytically from a neutron transport code such as DOT, a Discrete Ordinate Transport code, available from Electric Power Research Institute in Palo Alto, Calif. This code is an analytical tool for calculating how many neutrons get from a given assembly to a neutron detector. DOT is a two dimensional code. DORT, also available from the Electric Power Research Institute, is a three dimensional code that can similarly be employed for this purpose.

$\phi$=is the neutron flux in assembly (i,j)

V=the volume of the core $$SSF = \text{the static spatial factor} = \int \omega \phi \, dV / \int \phi \, dV \quad (2)$$

$\phi$ can be split into neutrons coming from a neutron induced fission source and neutrons coming from a fixed source(s) which are located in the core; (3)

Thus, $\phi = \phi_f + S$, where $\phi_f$=the neutrons coming from fissions and

S=the neutrons coming from the fixed neutron sources located in the core $$\int \phi \, dV = [\int \phi \, dV / \int S \, dV] * \int S \, dV, \text{ by equation 3, this becomes} = [\int \phi \, dV / (\int \phi \, dV - \int \phi_f \, dV)] * \int S \, dV = [1/(1-\lambda_{fx})] * \int S \, dV, \quad (4)$$

where $\lambda_{fx} = \int \phi_f \, dV / \int \phi \, dV$=the equivalent eigenvalue obtained from a subcritical, static, fixed source calculation (5)

Therefore, from equations 1 and 4, it is obtained that $$\text{Excore Signal} = SSF*[1/(1-\lambda_{fx})]*\int S \, dV, \text{ or } = SSF*[(1-\lambda_o)/(1-\lambda_{fx})]*[\int S \, dV/(1-\lambda_o)], \quad (6)$$

where $\lambda_o$=the fundamental mode eigenvalue which is traditionally used to relate to the reactivity of a nuclear system Thus, $$ICRR = 1/\text{Excore Signal} \quad (7)$$

Equation 6 can be rearranged as follows:

$$(1-\lambda_o) = (1/\text{Excore/Signal})*SSF*[(1-\lambda_o)/(1-\lambda_{fx})]*\int S \, dV, \text{ or} = ICRR*SSF*[(1-\lambda_o)/(1-\lambda_{fx})]*\int S \, dV, \quad (8)$$

or $$(1-\lambda_o^m) = ICRR*SSF*[(1-\lambda_o^P)/(1-\lambda_{fx})]*\int S \, dV, \text{ where}$$

$\lambda_o^m$=the measured $K_{eff}$ of the system $\lambda_{fx}$=the equivalent eigenvalue obtained from a subcritical, static, fixed source calculation, and $\lambda_o^P$=the predicted eigenvalue obtained from a subcritical, static calculation without fixed neutron sources Since $\int S \, dV$ is a constant, $SSF*[(1-\lambda_o^P)/(1-\lambda_{fx})]$ is the correction factor to be applied to the ICRR curve data that results in the corrected data being linear in $(1-\lambda_o^m)$, or $K_{eff}$, and therefore, also linear in reactivity.

A least-squares fit is then performed on the ICRR data corrected by $SSF * [(1-\lambda_o^P)/(1-\lambda_{fx})]$. This least-squares fit, which is a common mathematical technique, is part of a reactivity monitoring algorithm, which also calculates changes in reactivity based on a change in the excore source range detector level from one reactivity state to another. Linear extrapolation of the corrected ICRR data to a value of zero, where $K_{eff}$ equal 1.0, determines the $K_{eff}$ of the system under the measured conditions. The difference in the corrected data between two sets of measured conditions defines the reactivity change that has occurred between the two sets of measured conditions (e.g., rod withdrawn to rod inserted).

Thus, employing the correction factor provided by this invention, (i) the excore source range detector response to the nuclear core, as the core is brought to criticality, can accurately be represented by a simple analytical formulation; (ii) the measured Inverse Count Rate Ratio (ICRR) data can be adjusted by an analytical function so that the measured information is linear in $K_{eff}$ ($\lambda_o$) and reactivity; and (iii) based on the formulation of the detector response, the correction factor defined by this invention and the measured detector response, it is now possible to precisely determine reactivity changes made while the core is deeply subcritical. The current data indicates that this can be done not only for $K_{eff}$ values close to 1.0, but also for $K_{eff}$ values in the range of 0.92. Thus, based on the formulation of the detector response, the correction factor defined by this invention and the measured detector response, it is now possible to precisely measure $K_{eff}$ even when $K_{eff}$ is in the range of 0.92.

This invention can be employed in numerous nuclear applications including, but not limited to all types of reactor systems, spent fuel pools, nuclear material storage facilities, nuclear manufacturing facilities and nuclear waste facilities. For commercial pressurized water reactors, this invention can be used for a number of purposes including, but not limited to, determining and projecting the ICRR curve, reducing the consequences of a possible boron dilution event, determining all reactivity changes made while the plant is subcritical and measuring $K_{eff}$ while the plant is subcritical. Using the measured $K_{eff}$, the shutdown margin of the plant can be determined, and the Expected Critical Position for the plant can be determined, i.e., the position of control rod withdrawal at which the plant is estimated to go critical. Thus, this invention has significant commercial value to nuclear power plants in reducing their costs, increasing their revenue, and ensuring that the plants meet their technical specifications and are operated in a safe, reliable manner.

While specific embodiments of the invention have been described in detail, it will be appreciated by those skilled in the art that various modifications and alternatives to those details could be developed in light of the overall teachings of the disclosure. Accordingly, the particular embodiments are meant to be illustrative only and not limiting as to the scope of the invention, which is to be given the full breadth of the appended claims and any and all equivalents thereof.

What is claimed is:

1. A method of monitoring reactivity changes in a nuclear reaction when the nuclear reaction is subcritical comprising the steps of:

Controlling a parameter of the nuclear reaction that affects reactivity of the nuclear reaction to alter the reactivity;

monitoring an output of a source range detector;

determining periodically an Inverse Count Rate Ratio from the output of the source range detector during a steady-state portion of the output of the source range detector;

applying a correction factor, SSF * $[1-\lambda_o^P)/(1-\lambda_{fx})]$, to the Inverse Count Rate Ratio; and plotting the periodically determined Inverse Count Rate Ratio as a function of the parameter, wherein the correction factor makes the plot of the periodically determined Inverse Count Rate Ratios as a function of the parameter substantially linear.

2. The method of claim 1 including the step of applying a least squares fit to the plot of the Inverse Count Rate Ratio to form a linear plot.

3. The method of claim 1 including the step of linearly extrapolating the plot of the Inverse Count Rate Ratios to which the correction factor is applied, to zero to determine the further change of the parameter to criticality.

4. The method of claim 1 wherein the parameter is boron concentration of coolant surrounding the nuclear reaction.

5. The method of claim 1 wherein the parameter is control rod withdrawal from proximity to the nuclear reaction.

6. The method of claim 1 wherein the parameter is temperature changes in a coolant surrounding the nuclear reaction.

7. The method of claim 1 wherein the nuclear reaction occurs within a core of a nuclear reactor.

8. The method of claim 1 wherein the nuclear reaction occurs within a spent fuel pit.

9. The method of claim 1 wherein the nuclear reaction occurs within a nuclear material storage facility.

10. The method of claim 1 wherein the nuclear reaction occurs within a nuclear manufacturing facility.

11. The method of claim 1 wherein the nuclear reaction occurs within a nuclear waste facility.

* * * * *